United States Patent [19]

Haines et al.

[11] 4,436,848

[45] Mar. 13, 1984

[54] AQUEOUS CO-EMULSIONS OF EPOXY RESIN AND MINERAL OIL

[75] Inventors: Richard M. Haines, Warsaw; Robert Wong, Granville; Elisabeth J. Berger, Newark, all of Ohio

[73] Assignee: Owens-Corning Fiberglas Corporation, Toledo, Ohio

[21] Appl. No.: 484,131

[22] Filed: Apr. 12, 1983

[51] Int. Cl.³ .............. B32B 17/08; B32B 17/10; C08L 1/28; C08L 63/02
[52] U.S. Cl. ........................... 523/426; 428/378; 523/402
[58] Field of Search ............... 523/402, 426; 428/378

[56] References Cited

U.S. PATENT DOCUMENTS

| | | | |
|---|---|---|---|
| 3,772,870 | 11/1973 | Wong | 523/411 |
| 3,837,898 | 9/1974 | McCombs et al. | 428/378 |
| 3,850,869 | 11/1974 | Mohr | 428/378 |
| 4,140,833 | 2/1979 | McCoy | 523/411 |
| 4,330,444 | 5/1982 | Pollman | 428/378 |
| 4,361,465 | 11/1982 | Graham | 428/378 |
| 4,369,264 | 1/1983 | Baumann et al. | 428/378 |
| 4,394,475 | 7/1983 | Temple et al. | 428/378 |

Primary Examiner—Ronald W. Griffin
Attorney, Agent, or Firm—Ronald C. Hudgens; Greg Dziegielewski; James B. Wilkens

[57] ABSTRACT

An aqueous emulsion of epoxy resin or epoxy resin solution and mineral oil can be formed using a low level of predominantly non-ionic surfactant and an anti-static agent.

9 Claims, No Drawings

AQUEOUS CO-EMULSIONS OF EPOXY RESIN AND MINERAL OIL

FIELD OF THE INVENTION

This invention relates to the field of aqueous emulsions, particularly to the field of aqueous emulsions of epoxy resins, and more particularly yet to the field of aqueous emulsions of epoxy resins stabilized with substantially non-ionic surfactants and suitable for use in formulating sizing compositions for glass fibers.

BACKGROUND OF THE INVENTION

Aqueous emulsions of epoxy resins have long been known and used, e.g. in formulating adhesives, coatings, etc. In particular they have found use in formulating sizing compositions for glass fibers which are to be imbedded in a resinous matrix as mechanical reinforcement for articles fabricated therefrom, especially where such resinous matrix is itself an epoxy resin and the article is a tank or pipe fabricated by winding essentially continuous strands of the sized glass fibers about a suitable mandrel while concurrently impregnating with the matrix resin.

It is a particular object of the present invention to provide an aqueous co-emulsion of epoxy resin and mineral oil adapted for formulating improved sizing compositions for glass fibers.

SUMMARY OF THE INVENTION

This invention is an aqueous emulsion consisting essentially of: (a) about 30 to about 75 weight percent, based on the total weight of the emulsion, of (i) an emulsified liquid epoxy resin or (ii) a liquid solution containing a total weight of epoxy resin from about 30 to about 75 percent of the total weight of the emulsion and an organic solvent therefor; (b) about 1 to about 5 weight percent, based on the weight of the epoxy resin, of mineral oil; (c) about 5 to about 12 weight percent, based on the weight of the epoxy resin, of predominantly non-ionic surfactant for emulsifying the epoxy resin or solution thereof and the mineral oil; (d) about 0.5 to about 5 weight percent, based on the weight of the epoxy resin, of an anti-static agent; and (e) water.

DESCRIPTION OF PREFERRED EMBODIMENTS

The epoxy resin component of the emulsion can be any resin having epoxy functionally, preferably having at least about 2 vicinal epoxide groups per molecule thereof. In order that the epoxy resin emulsify easily and that the emulsified epoxy resin be capable of forming a coherent film upon drying the emulsion or an aqueous composition formulated therefrom at ordinary ambient workplace temperatures, it is preferred that the epoxy resin either be liquid at such temperatures or be dissolved with a suitable solvent or plasticizer to form a solution which is liquid at such temperatures and which preferably comprises a major proportion by weight of epoxy resin and a minor proportion by weight of solvent or plasticizer.

Particularly suitable epoxy resins for many purposes are glycidyl ether-terminated adducts of bisphenols such as bisphenol F or bisphenol A with a molar excess of epihalohydrin. Those having low epoxy equivalent weight (EEW), e.g. not greater than about 250 and preferably from about 175 to about 190, are especially advantageous, but epoxy resins with higher EEW's can also be used, particularly if a plasticizing solvent is also incorporated. Such plasticizing solvent for the epoxy resins is most advantageously blended with the epoxy resin before its emulsification into the aqueous medium. A particularly suitable solvent is diacetone alcohol, although others can be used if desired. A portion of the solvent, if any, may partition into the aqueous phase of the emulsion.

Even when an epoxy resin which is liquid at typical ambient workplace temperatures is used, it may be found advantageous to dissolve it with a plasticizer or solvent in order to facilitate the preparation of the emulsion, and it may also be found advantageous to heat the liquid epoxy resin or the liquid solution of epoxy resin to facilitate emulsification. Of course, if it is desired that all or a substantial portion of such solvent or plasticizer remain in the product emulsion, e.g. for aiding subsequent coalescence to form a coherent film, the temperatures to which mixtures containing the solvent or plasticizer are exposed during preparation of emulsions of the invention must be appropriately controlled.

The mineral oil component can be any mineral oil. Part or all of the mineral oil may form a solution or cosolution with the epoxy resin or the epoxy resin solution, respectively.

The surfactant for stabilizing the dispersion of the epoxy resin or epoxy resin solution and the mineral oil can be any suitable predominantly non-ionic surfactant, but it will frequently be found advantageous to employ a predominantly non-ionic mixture of surfactants. Particularly advantageous non-ionic surfactants are alkylaryloxypoly(alkoxy)alkanols, especially $C_{\geq 6}$-alkylaryloxypoly($C_{2-4}$-alkoxy)-$C_{2-4}$-alkanols such as Igepal (TM/GAF Corp.) CO210, which is a nonylphenoxypoly(ethoxy)ethanol having an HLB index of about 4.6, and Igepal (TM/GAF Corp.) CO890, or its 70% aqueous solution Igepal (TM/GAF Corp.) CO897, which is a nonylphenoxypoly(ethoxy)ethanol having an HLB index of about 17.8, and mixtures thereof. Minor proportions by weight of methylcellulose or similar material can also advantageously be included as part of the surfactant system, as can minor proportions of anionic surfactants.

The anti-static agent can be any suitable material such as an amide/ester or a partial amide of a fatty acid and a polyalkylene amine wherein less than all of the amine groups of the polyalkylene amine have been amidified. It may in some circumstances be found advantageous to at least partially neutralize any unamidified amine groups with a water soluble weak acid, such as acetic acid.

The relative proportions of the various components of the emulsions of the invention should generally be within the following ranges, given in weight percents based on the weight of the total emulsion for the epoxy resin and epoxy resin solution and based on the weight of the epoxy resin for the other components:

Epoxy resin and solution—about 30% to about 75%, preferably about 45% to about 60%;

Mineral oil—about 1% to about 5%, preferably about 2% to about 3%;

Surfactant—about 5% to about 20%, preferably about 6% to about 12%, and more preferably comprising, within either of these ranges, a major proportion by weight of a non-ionic material havng an HLB index of about 2 to about 7 together with minor proportions by weight of a non-ionic material having an HLB index of about 15 to about 20 and of methylcellulose;

Anti-static agent—about 0.5% to about 5%.

While the proportions indicated are not narrowly critical, the advantages to be derived from employing a lower that usual level of surfactant relative to the epoxy resin or solution thereof may not be realized if substantial departures from these proportions are made, especially as to the preferred upper limit of surfactant.

The emulsions of the invention can be prepared by conventional procedures. One particularly advantageous procedure is to first blend together the epoxy resin, solvent (if any), mineral oil, surfactant (except for methylcellulose or similar material), and anti-static agent to form a liquid mixture or solution. This mixture may advantageously be heated to a suitable temperature for fluidizing the mixture without excessive volatilization of the components thereof, if desired. A dilute aqueous premix of methylcellulose or similar material at about the same temperature is then slowly added to the epoxy-solvent-oil-surfactant-antistat blend with vigorous high shear agitation. Ordinarily a water-in-oil emulsion will form, but upon continued addition of the aqueous premix this will invert to an oil-in-water emulsion. Sufficient deionized water should then be added to achieve the desired final concentration and, if the temperature is significantly about ambient, the emulsion is mildly agitated while it is cooled to about ambient temperature.

Any suitable high shear mixing or agitating apparatus can be used.

EXAMPLE 1

A particularly advantageous emulsion of the invention has been prepared using the following formulation:

| Material | Wt. % of total emulsion |
|---|---|
| D.E.R. 330 epoxy resin | 51.02 |
| Diacetone alcohol (DAA) | 5.61 |
| Igepal CO 210 | 2.04 |
| Igepal CO 897 | 2.04 |
| Emerlube 7440 | 3.31 |
| Methocel A15LV | 0.25 |
| D.I. water | Balance to make 100 |

D.E.R. 330 (TM/Dow) is a liquid glycidyl ether-terminated bisphenol A/epichlorohydrin adduct having EEW of about 177–188. Igepal C1020 and C0897 (70% N.V.) are non-ionic surfactants identified herein above. Emerlube 7440 (TM/Emery Industries) is a blend of about 40% mineral oil, about 20% amide/ester anti-stat and about 20% surfactant in about 3:1 ratio of non-ionic to anionic. Methocel A15LV (TM/Dow) is methylcellulose.

The epoxy resin, diacetone alcohol, Igepal C0210 and C0897, and Emerlube 7440 were blended together with moderate agitation by a Myers (TM) high shear mixer at ambient temperature, then heated to about 150° F. while being subjected to vigorous agitation by increasing the speed of the mixer. A premix of the methylcellulose in about 80 times its weight of de-ionized water, also at about 150° F., was then slowly added, followed by the balance of the de-ionized water, while vigorous high shear agitation was continued and the temperature maintained at about 150° F. Inversion of the emulsion occurred before all of the premix had been incorporated. The emulsion was agitated at a low speed setting of the mixer while it was cooled to about ambient temperature. The product was a stable aqueous emulsion exhibiting the characteristic bluish color of small particle emulsions.

A sizing composition for glass fibers was prepared from this emulsion by diluting it with water and mixing therewith an organosilane coupling agent and polyvinyl pyrolidone. When glass fibers sized therewith were used to fabricate glass fiber reinforced epoxy resin articles, they exhibited superior properties in such characteristics as processability of the sized glass fibers during fabrication, rapid and thorough wetting of the sized glass fiber by the epoxy matrix resin, and shear and tensile strengths of the reinforced epoxy articles fabricated therefrom.

Numerous variations and modifications within the spirit of the invention as specifically described and exemplified will be apparent to those skilled in the art and are contemplated as being within the scope of the invention.

What is claimed is:

1. An aqueous emulsion consisting essentially of: (a) about 30 to about 75 weight percent, based on the total weight of the emulsion, of (i) an emulsified liquid epoxy resin or (ii) an emulsified liquid solution containing a total weight of epoxy resin from about 30 to about 75 percent of the total weight of the emulsion and an organic solvent therefor; (b) about 1 to about 5 weight percent, based on the weight of the epoxy resin, of mineral oil; (c) about 5 to about 12 weight percent, based on the weight of the epoxy resin, of predominantly non-ionic surfactant for emulsifying the epoxy resin or solution thereof and the mineral oil; (d) about 0.5 to about 5 weight percent, based on the weight of the epoxy resin, of an anti-static agent and (e) water.

2. An aqueous emulsion according to claim 1 wherein said non-ionic surfactant comprises a major proportion by weight of material having an HLB index of about 2 to about 7 and a minor proportion by weight of material having an HLB index of about 15 to about 20.

3. An aqueous emulsion according to claim 2 wherein said non-ionic surfactant further comprises a minor proportion by weight of methylcellulose.

4. An aqueous emulsion according to claim 1 wherein said non-ionic surfactant comprises a major proportion by weight of a $C_{\geq 6}$-alkylaryloxypoly($C_{2-4}$-alkoxy)-$C_{2-4}$-alkanol having HLB index from about 2 to about 7 and a minor proportion by weight of a $C_{\geq 6}$-alkylaryloxypoly($C_{2-4}$-alkoxy)-$C_{2-4}$-alkanol having HLB index from about 15 to about 20.

5. An aqueous emulsion according to claim 4 wherein said surfactant further comprises a minor proportion by weight of methylcellulose.

6. An aqueous emulsion according to claim 1 wherein said epoxy resin is characterized by an epoxy equivalent weight not greater than about 250.

7. An aqueous emulsion according to claim 6 wherein said epoxy resin is a glycidylether-termintaed adduct of a bisphenol and an epihalohydrin.

8. An aqueous composition according to claim 4 wherein said epoxy resin is characterized by an epoxy equivalent weight not greater than about 250.

9. An aqueous emulsion according to claim 8 wherein said epoxy resin is a glycidylether-terminated adduct of a bisphenol and an epihalohydrin.

* * * * *

UNITED STATES PATENT AND TRADEMARK OFFICE
CERTIFICATE OF CORRECTION

PATENT NO. : 4,436,848
DATED : March 13, 1984
INVENTOR(S) : RICHARD M. HAINES, ROBERT WONG and ELISABETH J. BERGER It is certified that error appears in the above-identified patent and that said Letters Patent is hereby corrected as shown below:

Column 3, line 50, "C1020" should read" should read -- C0210 --.

Signed and Sealed this

Thirtieth Day of October 1984

[SEAL]

Attest:

GERALD J. MOSSINGHOFF

Attesting Officer    Commissioner of Patents and Trademarks